April 7, 1970  H. A. ENGE  3,505,608
TRAVELING WAVE HIGH VOLTAGE GENERATOR
Filed Aug. 10, 1967  3 Sheets-Sheet 1
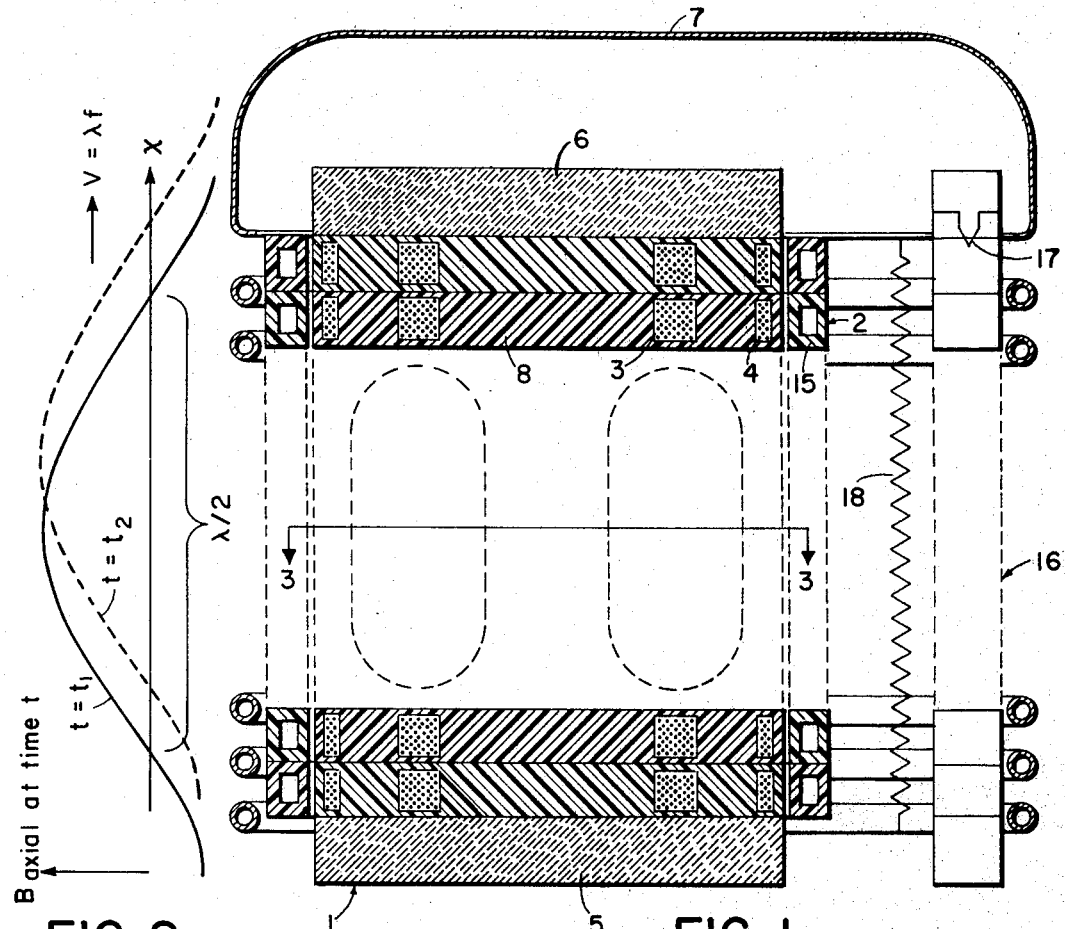
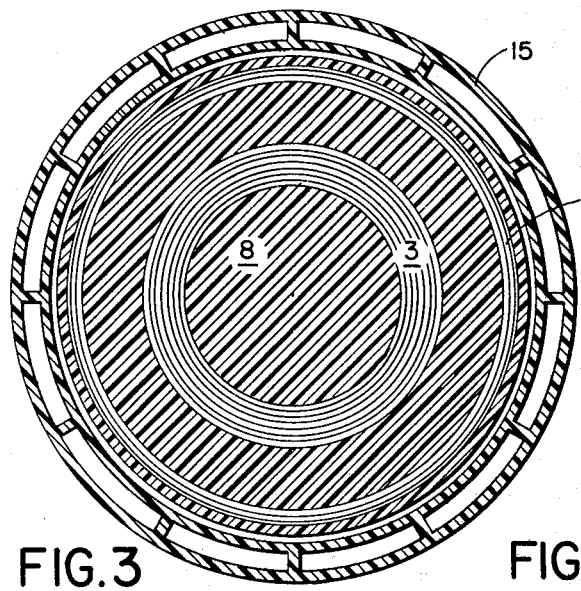
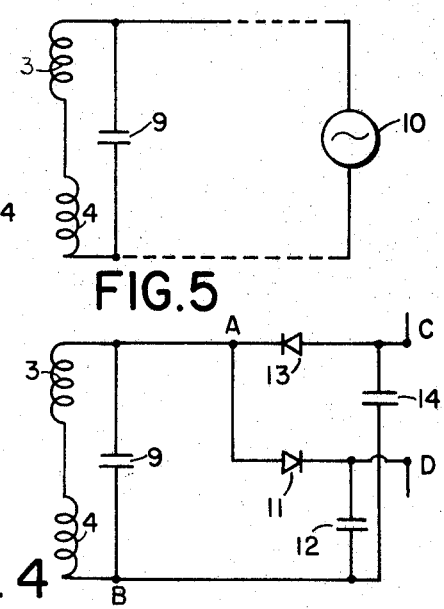

April 7, 1970  H. A. ENGE  3,505,608
TRAVELING WAVE HIGH VOLTAGE GENERATOR
Filed Aug. 10, 1967  3 Sheets-Sheet 3

United States Patent Office 3,505,608
Patented Apr. 7, 1970

3,505,608
TRAVELING WAVE HIGH VOLTAGE
GENERATOR
Harald A. Enge, Winchester, Mass., assignor to High
Voltage Engineering Corporation, Burlington, Mass.,
a corporation of Massachusetts
Filed Aug. 10, 1967, Ser. No. 659,742
Int. Cl. H05h 5/04; H02m 7/04
U.S. Cl. 328—233                                     7 Claims

ABSTRACT OF THE DISCLOSURE

This invention relates to the transmission of electric power across a high voltage and in particular to the generation of high voltage by means of an electromagnetic generator wherein the power is transmitted up through the high-voltage column by means of a traveling wave. In general, the invention comprehends a transformer wherein the secondary coil is divided into a series of secondary coil units. Each coil unit is connected to a capacitor which has such a value that the resonance frequency for each circuit is of the same order of magnitude as the frequency of the applied voltage. Adjacent coil units are electrically insulated from one another as regards the alternating-current part of the circuit, but spaced sufficiently closely to provide inductive coupling. The coil units may each be connected to rectifiers and the direct-current output of same may be coupled in series to build up a high D.C. voltage. The primary coil excites the secondary coil unit at one end of the assembly, and the oscillations in this coil unit are transmitted from coil unit to coil unit along the assembly by the inductive coupling. Thus the induction B goes like a traveling wave along the transformer. The wave length is some fraction, such as $\frac{1}{10}$ or $\frac{1}{20}$, of the length of the complete secondary. A small part of the power is tapped off and rectified in each unit. A representative embodiment of the invention might have for example 100 secondary coil units each generating between 30 and 50 kilovolts. For assembly purposes the coil units may be stacked one by one, or $n$ coil units may be pre-assmbled into an assembly unit, and the assembly units may then be stacked. The invention is not limited to the generation of high voltage, but includes other embodiments involving the transmission of electric power across a high voltage. For example, the invention may be used to transmit electric power from ground to the high voltage terminal of an electrostatic belt-type accelerator.

The invention may best be understood from the following detailed description thereof having reference to the accompanying drawings in which:

FIG. 1 is a longitudinal central section through a traveling wave generator embodying the invention;

FIG. 2 is a graph in which the magnitude of the component of magnetic induction along the axis of the device shown in FIG. 1 is plotted against position along that axis at time $t=t_1$ and $t=t_2$;

FIG. 3 is a transverse section along the line 3—3 of FIG. 1;

FIG. 4 is a circuit diagram showing the electrical circuit of a portion of the apparatus of FIGS. 1 and 3;

FIG. 5 is a circuit diagram showing the electrical circuit of another portion of the apparatus of FIGS. 1 and 3;

Figure 6:
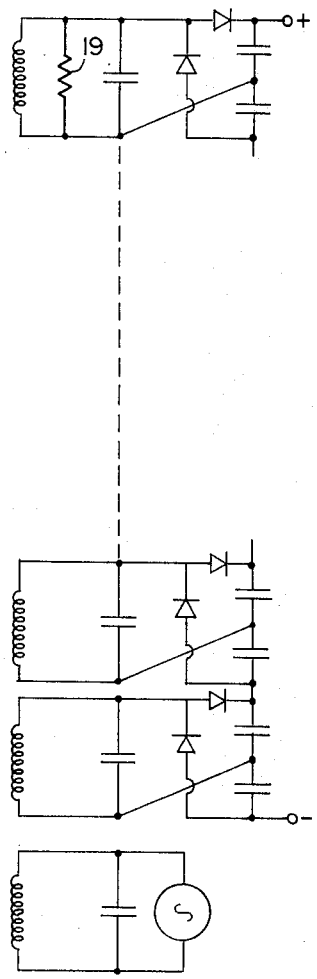
FIG. 6 is a circuit diagram showing the overall circuit of the apparatus of FIGS. 1 and 3.

Referring to the drawings and first to FIGS. 1 and 3 thereof, the traveling wave generator 1 of my invention is made up of a multiplicity of identical units 2 each unit including a pair of coils 3, 4. The units 2 are arranged or stacked so as to form a generally cylindrical assembly, adjacent units being electrically insulated from each other but magnetically coupled in a manner to be described in detail hereinafter. A large ferrite disc 5, 6 may be mounted at each end of the assembly to restrain the magnetic field at the ends of the assembly. The ferrite disc 6 at the high-voltage end of the assembly is enclosed in a high-voltage terminal 7 having rounded contours to avoid unnecessary concentrations of electric field.

The principal part of each unit 2 is a main coil 3 which may be wound by well known techniques and cast in an epoxy resin 8 to provide additional insulation and rigidity. Connected in parallel with each such coil there is a condenser 9, as shown in FIGS. 4 and 5, so as to form a circuit that is capable of oscillation. An auxiliary coil 4 with its turns going in opposite direction of those in coil 3 is connected in series with each main coil. The function of coil 4 is to confine the magnetic field to the space inside it so as to avoid induction heating of metallic parts outside.

A source of alternating voltage 10 is connected across the condenser 9 of the unit at one end of the assembly which unit will in general be at ground potential. The alternating voltage thus applied produces oscillations in the first unit 2. Because of the magnetic coupling between adjacent units oscillations are set up in the other units. That is to say, the oscillating energy is transmitted from unit to unit in much the same way as mechanical energy is transmitted along a sequence of pendulums the stems of which are connected by springs. The number of turns in each unit, and hence the inductance thereof, is chosen so as to give the desired voltage-current ratio at a given power level. The resonant frequency of each unit may be determined by adjusting the individual condensers 9. In general the transmission of energy from unit to unit occurs in such a way that a traveling wave is created which makes its presence observable by the change in phase of the oscillations of one unit as compared to that of the other units. The variations in phase from unit to unit will produce a sine wave pattern which moves along the assembly with a certain phase velocity and which will have associated therewith a certain wave length. As indicated the resonant frequency of each unit is determined by the selection of the condenser 9 and the actual frequency of oscillations is determined by the voltage source 10. Maximum power transmittal occurs at a particular value of capacitance for the condensers 9 which may be determined empirically but which will always be such that the wavelength $\lambda$ is of the order of magnitude of or somewhat longer than the diameter of coil 4.

The nature of the traveling wave is shown more clearly in the graph of FIG. 2 wherein the magnitude of the magnetic induction B is plotted against position on the axis of the apparatus of FIGS. 1 and 3. The solid line shows the variation of axial magnetic induction as a function of position on the axis at a time $t=t_1$ while the dotted line shows the same variation at a later time $t=t_2$. Thus it is seen that with the passage of time the pattern of the axial magnetic induction moves along the X axis with a velocity which is equal to the product of the wave length and the frequency of oscillations. It is important that the oscillations produce a traveling wave rather than a standing wave if a uniform D.C. gradient is desired. Also, the phase variations of a traveling wave between the units will reduce the total ripple voltage.

In accordance with the invention the output of each unit is rectified and the rectified outputs are all connected in series so that the D.C. outputs of each unit are added cumulatively to produce a high voltage output. In the circuit shown in the drawing a voltage doubler circuit is used with each unit.

Referring to FIG. 4 during that portion of the cycle in which the potential of point A is positive with respect to that of point B current will flow through rectifier 11 so as to charge condenser 12. During the other half of the cycle when the potential of A is negative with respect to that of point B, current will flow through rectifier 13 and charge condenser 14. Thus a unidirectional potential difference is built up between the points C and D which is approximately twice the maximum potential difference between the points A and B. The condensers 9, 12 and 14 as well as the rectifiers 11 and 13 are all stored within a suitable container 15 which is mounted outside of and around the auxiliary coil 4 as shown in FIG. 3. The primary coil unit may or may not have rectifiers connected to it. FIG. 5 shows the unit without rectifiers. The number of turns in the primary may be different from those in the secondary units if a proper matching to the power source 10 so requires. The D-C output of each unit 2 appearing across the terminals C and D are connected in series and applied to the load which in FIG. 1 is shown as an electron acceleration tube 16 having a filament 17 which emits electrons for acceleration to the grounded end of the tube. If the acceleration tube and the power stack are in the same high-voltage column as shown in FIG. 1, a uniform gradient for the column and tube is provided by the connections to the power stack. If the tube is in a separate high-voltage column, a resistor 18 is needed in this column to provide uniform voltage distribution. Thus by means of this resistance 18 as well as by means of the load exemplified by the acceleration tube 16 all the units 2 are connected in series from the D-C point of view but are isolated from one another from the A-C point of view.

Unless an appropriate termination is provided at the high voltage end of the assembly, on arrival at the high voltage end the A.C. power will be reflected, with the result that standing waves are produced. This is undesirable because the voltage output of the various units will not be uniform from unit to unit but will be zero for some units and a maximum for other units. One way of preventing this is to provide a power consuming load 19 at the high voltage end of the assembly, as shown in FIG. 6. This power is of course wasted and thus reduces the efficiency of the device.

A second embodiment of the invention particularly applicable for tandem accelerators continues the series of units by providing so to speak a mirror image of the first assembly. From the A.C. point of view this simply doubles the length of the previous assembly. However, by simply providing a resistive path to which the various units are connected the D.C. potential of each unit in this second series may be caused to vary sequentially from high voltage to ground. In this way the D.C. potential of the last unit is at ground which is the same D.C. potential as that of the first unit. Consequently the last unit may be electrically connected to the first unit so as to provide A.C. coupling with the result that the A.C. power can be recycled thereby avoiding the need for a power consuming load.

Figure 7:
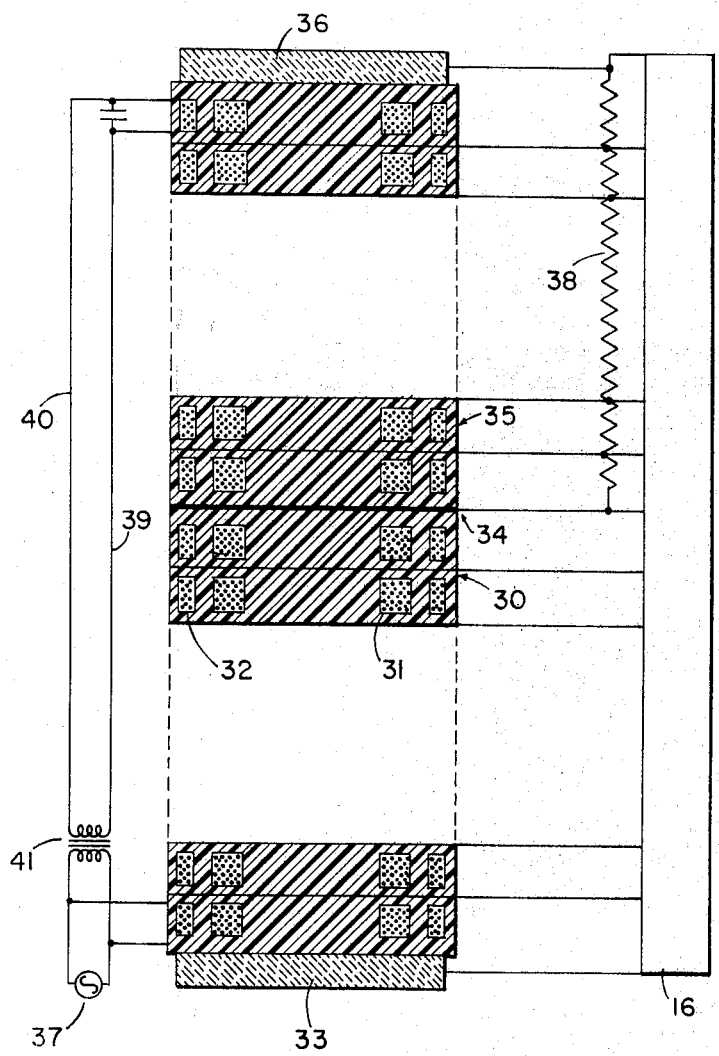
FIG. 7 is a view similar to that of FIG. 1 and showing an alternative embodiment of the invention.

Referring now to FIG. 7 the series of units 30 are similar to the units 2 of FIG. 1 and each comprises a main coil 31 and an auxiliary coil 32. A ferrite disk is provided at the grounded end of the stack as shown at 33. The ferrite disk 33 is similar to and serves the same function as the ferrite disk 5 of FIG. 1. Unlike the device of FIG. 1, in the device of FIG. 7 there is no ferrite disk at the high potential end 34 of the column and a second column forming an extension of the first is made up of a series of coil units 35 forming a stack which is the mirror image of the stack of units 30 and which terminates in a grounded ferrite disk 36. The unit 30 at the grounded end of the device is excited by an A-C generator 37 which is similar to the A-C generator 10 shown in FIG. 5. Each unit 35 includes a condenser but does not include any rectifiers. Some point of each unit 35 is connected to an appropriate potential level on a resistive path 38 so as to maintain it at an appropriate DC potential level. The sole function of the units 35 is to transmit the A-C power and so they do not deliver any power to a load. The A-C oscillations which appear across the last and grounded unit 35 is fed back to the grounded unit 30 by the two leads 39 and 40 which are connected to the primary of a coupling transformer 41 whose secondary is connected across the output of the A-C generator 37.

The second series of coils may be arranged as an extension of the first series of alternatively and may be arranged adjacent to the first series. In the latter event the coupling at the high voltage end must be electrical rather than magnetic.

Cooling may be provided by blowing a compressed gas from unit to unit through ducts spiralling between the main coils and the auxiliary coils.

Typical dimensions would be 20 inches for the outside diameter of the auxiliary coils and an additional space around the outer periphery having a thickness of about one inch or more in order to provide room for the condensers and rectifiers.

Because the phase varies sequentially from one coil to the next the ripple in the D.C. output is very low. Moreover because the generator in general will be operated at a high frequency of for example 10 kilocycles the ripple is very easily filtered in the first place.

Figure 8:
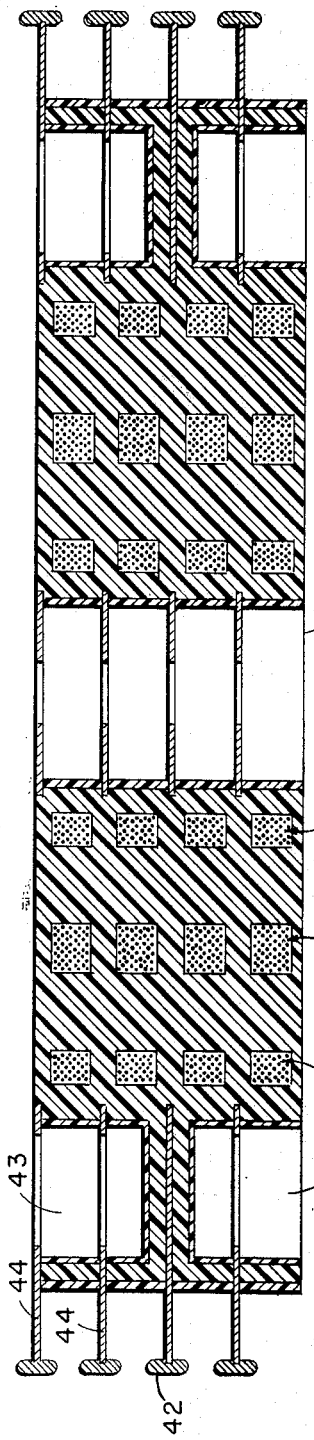
FIG. 8 is a view similar to that of FIG. 1 and showing still another embodiment of the invention.
Figure 9:
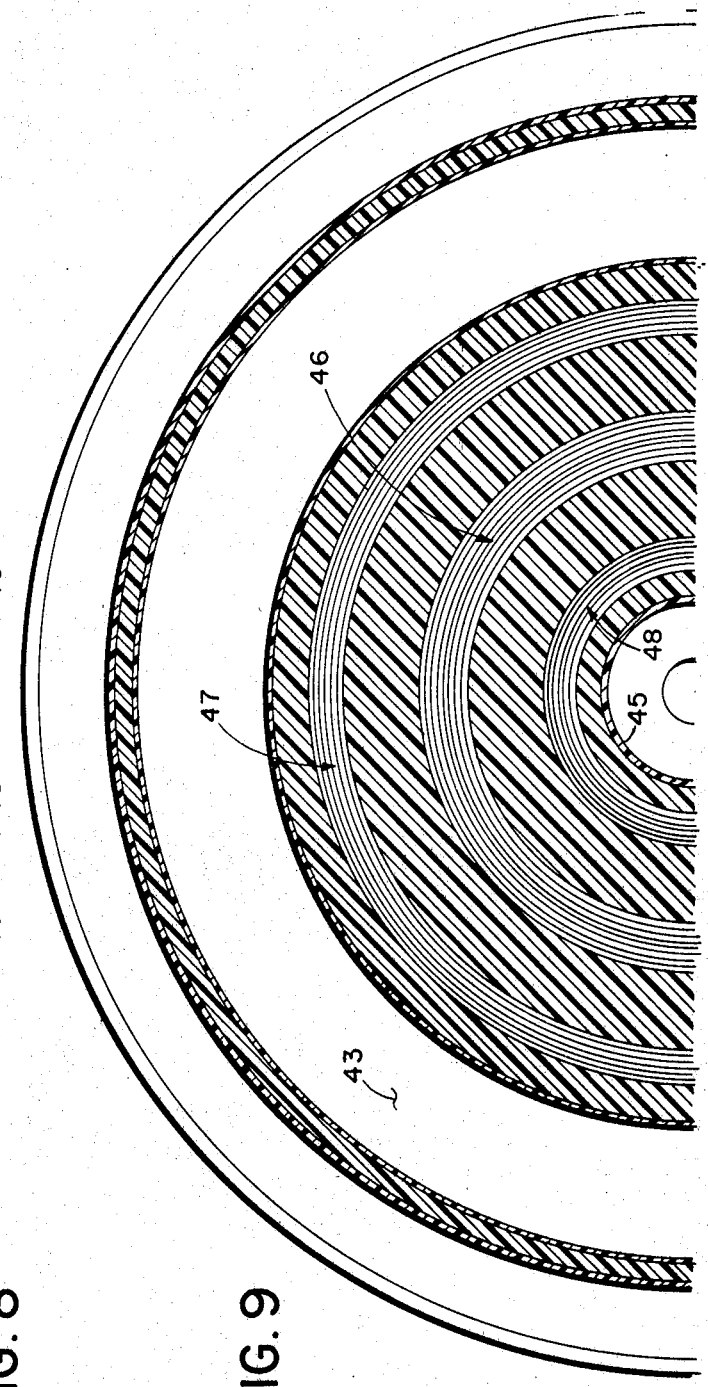
FIG. 9 is a transverse sectional view along the line 9—9 of FIG. 8.

Still another embodiment of the invention is shown in FIG. 8 and FIG. 9. In the embodiment therein shown each unit 42 for purposes of assembly is made up of four coil units as hereinbefore described and each such assembly unit 42 includes two compartments 43 for components such as capacitors and rectifiers. Each such compartment 43 is two coil units thick (for instance) and a suitable electrical connection (such as a simple wire) (not shown) is provided across the compartment to connect the inner and outer portions of the equipotential plane 44 at that region. Each assembly unit 42 is an independent unit and the generator itself is constructed merely by stacking the proper number of assembly units 42. The embodiment shown in FIGS. 8 and 9 includes an acceleration tube 45 comprising segments each mounted within an assembly unit 42. The stack of assembly units 42 is clamped together by some appropriate mechanical means and appropriate gasketing (not shown) is provided for a vacuum tight seal around the acceleration tube 45 between units. As in other embodiments of the invention each unit includes a main coil 46 and an auxiliary coil 47 for confining the magnetic field outside the main coil 46. In the embodiment shown in FIGS. 8 and 9 the acceleration tube 45 which is within the main coil 46 must be shielded from the magnetic field and consequently a second auxiliary coil 48 must be provided inside the main coil 46 and outside the acceleration tube 45. As before, the rectifiers and the condensers are placed outside the first auxiliary coil 47 in the special compartments 43 to which access may be had for maintenance and repairs when the assembly unit 42 is removed from the stack.

Having thus described the principles of the invention together with several illustrative embodiments thereof, it is to be understood that although specific terms are employed they are used in a generic and descriptive sense and not for purposes of limitation, the scope of the invention being set forth in the following claims.

I claim:

1. Apparatus for transmitting electrical power comprising, in combination, a series of coil units through which electric current may flow about an axis; means for mounting said coil units in a linear array having a common axis about which said currents flow so that said coil units are axially spaced and electrically separated from one another, said axial spacing being sufficiently close so that said coil units are magnetically coupled; and means for producing an alternating electric current in at least one of said coil units having a known frequency; each coil unit having associated with it a capacitance such that the resonance frequency of each coil is of the order of magnitude of said known frequency, whereby power is transmitted from coil unit to coil unit by means of a traveling wave.

2. Apparatus in accordance with claim 1, wherein a power-consuming load adapted to consume a portion of the available power is connected to a coil unit remote from the coil unit in which said alternating electric current is produced, whereby reflection of the travelling wave is hindered.

3. Apparatus in accordance with claim 1, wherein each coil unit comprises a main coil and an auxiliary coil which is outside the main coil and which is wound in an opposite direction from that of the main coil.

4. Apparatus for generating high voltage comprising, in combination, a first terminal and a second terminal between which high voltage is to be generated; a resistive load electrically connecting said terminals; a series of coil units through which electric current may flow about an axis; means for mounting said coil units in a linear array having a common axis about which said currents flow so that said coil units are axially spaced but sufficiently close so that said coil units are magnetically coupled; and means for producing an alternating electric current in at least one of said coil units having a known frequency; the remainder of said coil units being connected through rectifiers to said resistive load, said rectifiers being so oriented as to prevent electrical transmission of alternating current between coil units while permitting electrical transmission of direct current between said terminals through said rectifiers, each coil unit having associated with it a capacitance such that the resonance frequency of each coil unit is of the order of magnitude of said known frequency, whereby power is transmitted from coil unit to coil unit by means of a traveling wave.

5. Apparatus in accordance with claim 4 having a second series of coil units through which electric current may flow about an axis; means for mounting said coil units of said second series in a linear array having a common axis about which said currents flow so that said coil units of said second series are axially spaced but sufficiently close so that said coil units of said second series are magnetically coupled; a resistive path between said first terminal and said second terminal; and means for connecting said coil units of said second series to said resistive path so that the potential of said coil units of said second series varies sequentially from that of said first terminal to that of said second terminal.

6. Apparatus in accordance with claim 4 having an acceleration tube for the acceleration of charged particles electrically connected between said first terminal and said second terminal, said acceleration tube comprising segments each mounted within a coil unit.

7. Apparatus in accordance with claim 6, wherein each unit comprises a main coil and two auxiliary coils one of which is outside the main coil, the other inside the main coil but outside the acceleration tube segment, both of said auxiliary coils being wound in an opposite direction from that of the main coil.

References Cited
UNITED STATES PATENTS

| | | | |
|---|---|---|---|
| 2,480,169 | 8/1949 | Westendorp | 328—233 |
| 2,853,622 | 9/1958 | Hansen | 250—87 |
| 2,971,145 | 2/1961 | Enge | 321—27 X |
| 3,419,786 | 12/1968 | Brane | 321—27 |

JAMES W. LAWRENCE, Primary Examiner

E. R. LA ROCHE, Assistant Examiner

U.S. Cl. X.R.

321—27; 336—170